United States Patent [19]

Sosa et al.

[11] Patent Number: 4,777,210

[45] Date of Patent: Oct. 11, 1988

[54] CONTINUOUS PRODUCTION OF HIGH IMPACT POLYSTYRENE

[75] Inventors: Jose M. Sosa, Big Spring; Jimmy D. Nichols, Port Arthur, both of Tex.

[73] Assignee: Cosden Technology, Inc., Dallas, Tex.

[21] Appl. No.: 889,250

[22] Filed: Jul. 25, 1986

[51] Int. Cl.$^4$ ............................................ C08F 279/02
[52] U.S. Cl. ..................................... 525/53; 525/51; 525/316
[58] Field of Search ................................ 525/53, 51

[56] References Cited

U.S. PATENT DOCUMENTS

| | | |
|---|---|---|
| 3,035,033 | 5/1962 | Schweitzer, Jr. et al. . |
| 3,243,481 | 3/1966 | Ruffing et al. . |
| 3,591,537 | 7/1971 | Squire et al. . |
| 3,658,946 | 4/1972 | Bronstert et al. . |
| 3,903,040 | 9/1975 | Politte . |
| 3,903,202 | 9/1975 | Carter et al. . |
| 4,144,204 | 3/1979 | Mittnacht et al. . |
| 4,146,589 | 3/1979 | Dupre . |
| 4,153,647 | 5/1979 | Glukhovskoi et al. . |
| 4,371,663 | 2/1983 | Russell . |
| 4,451,612 | 5/1984 | Wang et al. . |
| 4,452,751 | 6/1984 | McCullough et al. . |
| 4,567,232 | 1/1986 | Echte et al. ............................ 525/53 |

FOREIGN PATENT DOCUMENTS

| | | |
|---|---|---|
| 0096447 | 12/1983 | European Pat. Off. . |
| 0138723 | 8/1983 | Japan ................................... 525/51 |

OTHER PUBLICATIONS

PCT Application No. 80/00325, filed Mar. 26, 1980, Inventors: Bubeck et al., "Factors Influencing Rubber Phase Morphology in Polystyrene", by H. Keskkula; May 1979.
"Diene Rubber for Impact Modification of Plastics"; Product Information from Firestone.

*Primary Examiner*—Wilbert J. Briggs, Sr.
*Attorney, Agent, or Firm*—Roger W. Parkhurst; John K. Abokhair; M. Norwood Cheairs

[57] ABSTRACT

The invention relates to a continuous flow process for producing polystyrene having discrete particles of rubber included therein. The process utilizes a pre-inversion reactor, in which a solution of styrene, polystyrene and rubber are mixed prior to being introduced into a second stirred tank reactor. The viscosity of the solutions in the pre-inversion reactor and in the second stirred tank reactor are closely controlled to produce desirable HIPS products.

12 Claims, 5 Drawing Sheets

CONTINUOUS PRODUCTION OF HIGH IMPACT POLYSTYRENE

FIELD OF THE INVENTION

The present invention relates to a method for the production of high impact polystyrene. More particularly, the invention relates to a continuous flow process for producing polystyrene having discrete particles of rubber included therein. The process results in a high impact polystyrene having a high environmental stress crack resistance (ESCR) and a high falling dart impact strength. Moreover, the continuous flow process enables products to be produced with any desired grain size and more importantly, such products can be reproduced reliably.

BACKGROUND OF THE INVENTION

It is well known that rubber-reinforced polymers of monovinylidene aromatic compounds, such as styrene, alphamethylstyrene and ring-substituted sytrenes are desirable for a variety of uses. More particularly, rubber-reinforced polymers of styrene having included therein discrete particles of a cross-linked rubber, for example, polybutadiene, the discrete particles of rubber being dispersed throughout the styrene polymer matrix, can be used in a variety of applications including refrigerator linings, packaging applications, furniture, household appliances and toys. The conventional term for such rubber-reinforced polymers is "high impact polystyrene" or "HIPS". The physical characteristics and mechanical properties of HIPS are dependent upon many factors including the particle size of the cross-linked rubber particles. More particularly, the size of cross-linked rubber particles can affect such properties as environmental stress crack resistance (hereinafter referred to as ESCR), tensile strength, flexural strength and impact strength. For example, when the cross-linked rubber particles are small in size, properties such as tensile strength and gloss of the HIPS product are maximized, but percent elongation at break and impact strength are diminished. Conversely, when the rubber particle size is increased, properties such as tensile strength and gloss are reduced.

Numerous experimental efforts have been made to determine what size or size distribution of cross-linked rubber particles dispersed throughout a polystyrene matrix would be the most desirable for particular applications. However, even though much experimentation has occurred and desirable HIPS products have been produced, known production processes have a major drawback which relates generally to inaccurate control of rubber particle size in the HIPS product. Thus, even though certain grain sizes of the rubber particles have been found to produce desirable results, reproducing similar products on a daily production basis has heretofore been very difficult. Moreover, when it was desired to change a HIPS product slightly, corresponding changes in the production process have been difficult.

One proven process for producing HIPS products has been the batch or suspension process. The batch or suspension process involves the use of a single reaction vessel where polymerization occurs. Batch process formation of HIPS products has desirable aspects which include ease of control of rubber particle size due to the ability to monitor the single reaction vessel throughout the polymerization process and accordingly, high reproducible results are inherent from the batch process because of such monitoring capabilities. However, inherent shortcomings of the batch process are the amount of yield from the process and the downtime of the single reaction vessel. Thus, the batch process is not commercially feasible.

The commercial difficulties associated with the batch process have resulted in many experimenters attempting to utilize some type of continuous flow process for the manufacture of HIPS. Each of the known continuous flow processes utilize a plurality of reaction vessels wherein polymerization increases from one vessel to the next. For example, Bronstert et al (U.S. Pat. No. 3,658,946), Ruffing et al (U.S. Pat. No. 3,243,481), Wang et al (U.S. Pat. No. 4,451,612), Dow, (European Patent Application 0,096,447), and (Dow PCT Application U.S. Pat. No. 80/00325) are all examples of various attempts to produce HIPS by different continuous flow processes. Each of these known continuous flow processes have somewhat different objectives. However, each of the known processes suffers from the above-discussed drawbacks, namely, difficulties associated with reproducibility of results, the problems attendant physical changes in the HIPS products and rubber grain size control problems. For example, because many more reaction vessels are utilized in a continuous flow process, as compared to the batch process which utilizes a single reaction vessel, there are many more parameters to control and thus numerous opportunities for process modifications which can result in different HIPS products on a daily or hourly basis. Thus, there has been a long-felt need in the art to determine what is responsible for such changes in products and a corresponding need to provide a process which is controllable and can reproduce desired HIPS products reliably. It is important to control the size of the cross-linked discrete rubber particles contained in the polystyrene matrix because properties such as ESCR, IZOD impact strength, percent elongation and tensile strength, are directly affected by the particle size of the rubber particles.

SUMMARY OF THE INVENTION

The present invention overcomes the drawbacks of the known continuous production processes. The present invention provides a continuous flow process for producing high impact polystyrene, and provides a reliable and reproducible method for producing varying grain sizes of rubber particles which are cross-linked with polystyrene and dispersed as discrete particles throughout a polystyrene matrix. The process utilizes a preinversion reactor, in which a solution of styrene, polystyrene, rubber, such as polybutadiene, and a peroxide catalyst are mixed prior to being introduced into a second stirred tank reactor which is in series with the pre-inversion reactor. The viscosity, or solids content, of each of the solutions in the preinversion reactor and the second stirred tank reactor are closely controlled to produce desirable HIPS products.

DETAILED DISCUSSION OF THE PREFERRED EMBODIMENTS

Figure 1:
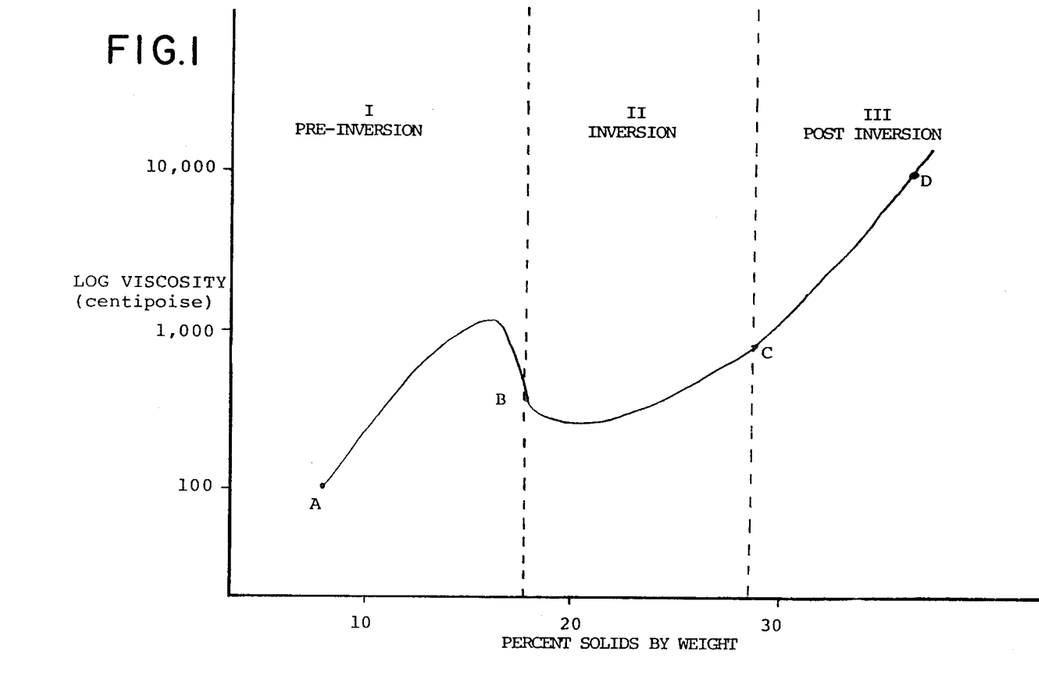
FIG. 1 is a graph which shows the typical relationship between log viscosity and percent solids by weight of a high impact polystyrene composition subjected to a batch or suspension process.

FIG. 1 is a representative graph showing the relationship between viscosity and percent solids content of a high impact polystyrene composition in a batch or suspension-type process. There are three general portions of the curve represented by the numerals I, II and III. The numeral I represents the pre-inversion zone, the numeral II represents the inversion zone and the numeral III represents the post-inversion zone. In general, the term "pre-inversion" refers to the initial stages of polymerization of a styrene monomer-rubber mixture. More particularly, during pre-inversion styrene and rubber are a continuous phase in a solution, while polystyrene is a discontinuous phase. Thus, as polymerization is induced between the points "A" and "B" on the curve, a polymer forms from the styrene-rubber solution and becomes the discontinuous phase. However, upon reaching the point "B" in FIG. 1, the system can no longer be characterized as having a continuous phase of a styrene-rubber mixture and a discontinuous phase of polystyrene, but rather, the system now is characterized as having a continuous phase of polystyrene and a discontinuous phase of dispersed droplets of rubber, or preferably, the droplets are a mixture of polystyrene and rubber. The instant when the polymer changes from the discontinuous phase to the continuous phase is called the phase inversion point. Typically, phase inversion occurs when the solids content becomes approximately twice the amount of rubber initially added to the system. For example, if point A in FIG. 1 corresponds to a starting weight percent solids of rubber of 7-8%, then, typically, the phase inversion point, represented by the point "B", will be within the range of 14-16 percent solids. The phase inversion point can be shifted either to the right or to the left of the point "B" in FIG. 1, depending upon various factors such as the amount of grafting between rubber and polystyrene, the molecular weight of the rubber used, the molecular weight of the polystyrene and concentration and type of addition or solvents. Moreover, the viscosity of such solutions are also affected by these same factors (i.e., two solutions of similar composition and solids content can have different viscosities due to the above-noted factors). However, the general rule that phase inversion occurs at approximately twice the percent solids of a starting rubber is generally accurate.

While inversion is typically referred to as a discrete point which corresponds to a particular percent solids content, the inversion zone is usually identified as including a range of percent solids. The inversion zone can be characterized as being all points where the discontinuous rubber particles dispersed throughout the continuous polystyrene matrix are soft and are capable of being easily deformed by mechanical agitation. The rubber precipitate is generally referred to as the gel or soft component of the composite mixture (i.e., the grafted rubber particles are the softer of the two components in the polystyrene-rubber mixture).

The third portion of the curve, the post-inversion zone, is represented by numeral III. The post-inversion zone relates to the formation of more polystyrene from the styrene solution.

The above-discussed batch process significantly differs from a continuous flow process because in a continuous flow process a plurality of reaction vessels connected together in series are utilized. The reaction vessels are typically a combination of continuous stir tank reactors and plug-flow reactors. In each of the reaction vessels, especially the continuous stir tank reactors, a substantially uniform percent solids, or percent solids distribution exists. Accordingly, a continuous flow process can not follow the curve representative of a batch process disclosed in FIG. 1. Thus, the desirable reliable control and reproducibility of the batch process for producing HIPS products has previously not been obtainable in continuous flow processes.

It is believed that primary reason for the unreproducibility of HIPS products by using continuous flow processes relates to various phenomena which occur when a rubber feed solution is inputted directly into a reaction vessel which is operating at a percent solids content above the inversion point. Specifically, it appears that phase inversion of the feed solution occurs essentially immediately upon the addition of the feed solution to such a reaction vessel. Thus, it has been discovered that a critical point in the continuous flow process for producing HIPS is the instant that a feed solution at a pre-inversion stage is introduced into a stirred reaction vessel which is operating above the inversion point. Accordingly, the properties of the feed solution, such as viscosity, appear to be very important.

Figure 2:
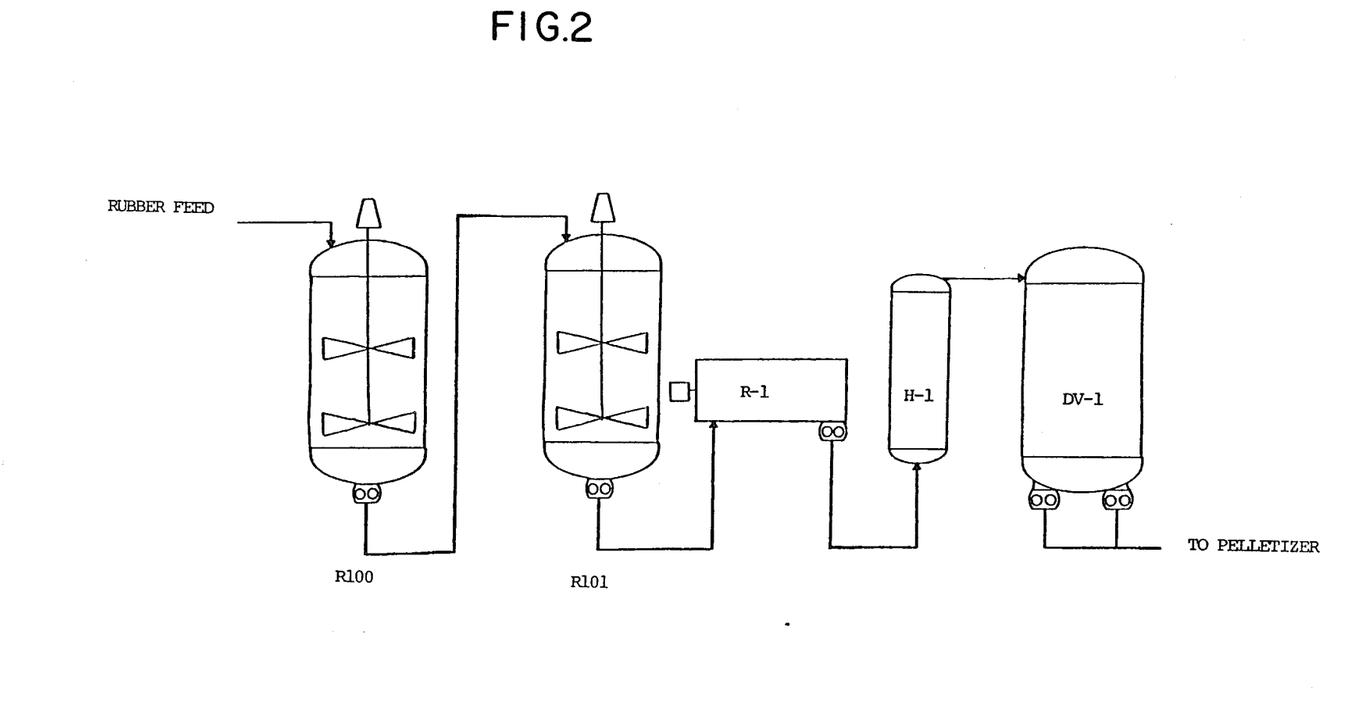
FIG. 2 is a schematic representation of the reaction vessels utilized in the process of the present invention.

FIG. 2 is a schematic representation of essential portions of the apparatus which can be utilized to practice the method of the present invention. The reaction vessel R101 is a conventional continuous stir tank reactor (hereinafter CSTR) which operates at a percent solids level above the inversion point. At least one plug flow reactor R-1 receives the output of CSTR R101 and polymerization in the post-inversion stage occurs in the reactor R-1. The output of R-1 is directed to a conventional heater H-1 a conventional devolatizer DV-1 and to a conventional pelletizer (not shown in drawings). However, the critical portion of the apparatus used for practicing the present invention is the CSTR R100. This reaction vessel is operated at pre-inversion conditions (i.e., where the continuous phase is a styrene-rubber solution and the discontinuous phase is polystyrene). It has been discovered that by close control of the solution which exits from the pre-inversion reactor R100 (hereinafter PIR) and into R101, the desirable aspects of the batch process, depicted in FIG. 1, can be obtained. More particularly, it has been discovered that the continuous flow process can be "tricked" into behaving similar to a batch process if operating conditions in the PIR R100 and CSTR R101 are closely controlled.

For example, extensive experimentation has been conducted and it has been discovered that when solution viscosities of the mixtures in the PIR R100 and the CSTR R101 approach each other, that the continuous flow process more closely approximates the batch process depicted in FIG. 1. A feed solution which is to be injected into CSTR R101 can be 100-300 centipoise at typical operating conditions, while the solution in CSTR R101 may be 6000-10,000 centipoise. By using the PIR R100, the solution viscosity of the solution which is to be fed into CSTR R101 is increased to 2000-4000 centipoise. Thus, the difference in viscosities of materials in CSTR R101 and PIR R100 is about a factor of 2-3, while the viscosity difference between the feed solution and the CSTR R101 solution could be as much as 80–100. For example, as discussed previously, because phase inversion occurs essentially immediately upon introduction of a feed solution (from R100) into a CSTR (R101) which is operating at a percent solids level above an inversion point of the system, it is important to control properties of the feed solution which is inputted into R101 as well as controlling the properties of the solution in R101. The substantially instantaneous inversion which occurs when the feed solution contacts R101 can be very undesirable because resultant rubber particles in the polystyrene matrix may not have sufficient amounts of polystyrene trapped within the rubber molecules. Thus, such rubber molecules tend to be too small in size. Therefore, even when grafting initiators capable of inducing the desired amount of grafting of polymer to rubber particles are included, required amounts of grafting of the rubber to the polystyrene may not occur. Moreover, use of the PIR promotes more thorough mixing of the rubber with the styrene/polystyrene mixture prior to introducing the mixture into R101. This thorough mixing also assists in trapping polystyrene within discrete rubber molecules so that when the mixture from the PIR R100 is inputted into R101, the instantaneous inversion of the feed still results in rubber particles having desirable physical properties.

While it is theorized that as the number of CSTR reactors operating in both pre-inversion and inversion/post inversion stages increases, the continuous flow process more closely approximates the viscosity curve of the batch process depicted in FIG. 1. However, it is necessary to provide only one pre-inversion reactor and one post-inversion reactor together in series, in combination with other conventional processing steps, such as plug flow polymerization reactions, heating, devolatizing and pelletizing, to achieve simulated batch conditions. More particularly, applicants have discovered that the most commercially significant embodiment of the invention occurs when the percent solids content in the PIR R100 is maintained at a level just below the inversion point and the percent solids content of R101 is maintained at a level which places it in the post inversion range. For example, in reference to the viscosity curve for the batch process shown in FIG. 1, the PIR R100 is run at a point close to the point "B", while R101 is run at a point somewhere between the points "C" and "D". The precise point of operation between the points "C" and "D" is dependent upon competing factors. From a mass production standpoint, the closer that the system can be operated toward point "D", the higher the production rate. However, from a process control and batch-type process simulation standpoint, it is better for R101 to operate closer to point "C". Choice of the precise point of operation of R101 occurs through the following procedure.

After the inversion point for the solution in PIR R100 has been determined and the solution in R100 approaches the inversion point (i.e., when the percent solids approaches the point "B" in FIG. 1), the solution viscosity of the solution in PIR R100 is determined by direct measurement thereof, or by calculating the viscosity based upon predetermined relationships between percent solids and viscosity. The solution viscosity is dependent upon the molecular weight of the polystyrene, the molecular weight of the rubber, the amount of grafting between the polystyrene and the rubber, etc. After determining the solution viscosity of the solution in PIR R100, an acceptable solution viscosity for the solution in CSTR R101 can then be calculated. While the best results for continuity and control of particle size in a HIPS product are realized when the solution viscosity of the PIR R100 and the CSTR R101 are substantially equivalent, acceptable results occur when such solution viscosities differ by a factor of not more than 5–10. Preferably, the difference between the solution viscosities should not be greater than a factor of 2–3.

By following the above procedure, applicants ameliorate two problems inherent in the prior art. First, by utilizing the PIR R100, the amount of very small rubber particles in a polystyrene matrix are reduced. Particularly, use of the PIR results in a large amount of polystyrene being trapped within the rubber molecules. Such occlusions of polystyrene within rubber causes the system to behave as if more rubber was present than what actually is present. This concept is analogous to filling a balloon with air, the balloon being the rubber and the air being polystyrene. Accordingly, the most expensive of the components in HIPS products, the rubber component, can be reduced in amount, thereby reducing production costs. Second, there is a thermal expansion mismatch which exists between typical polystyrenes and typical rubbers, such as polybutadiene, which are used in HIPS products. The thermal expansion mismatch is mitigated when polystyrene is occluded within such polybutadiene rubber particles. Accordingly, the smaller rubber particles which have substantially no, or little, polystyrene included therein, actually function as stress concentrators or initiators within the polystyrene matrix. The presence of stress initiators is undesirable because mechanical properties such as tensile strength and IZOD impact strength are reduced. Moreover, as shown in the examples which follow, it has been discovered that the rubber particle size in the CSTR R101 is substantially equivalent to the rubber particle size in resultant HIPS pellets. Thus, this fact shows the importance of precise control of the solution which is fed into CSTR R101 because whatever rubber particle size is present in R101, the same rubber particle size will be present in the HIPS product.

Accordingly, by utilizing a PIR in series with at least one post inversion reactor, the PIR operating at a maximum weight percent solids which is just below the inversion point of the solution and assuring that the viscosity of the solution in the PIR is substantially equivalent to the solution viscosity of the solution in a post-inversion reactor (i.e., preferably within a factor of 2–3 of each other) then the inversion zone, represented by the numeral II in FIG. 1, is effectively skipped in the continuous flow process, but the continuous flow process is tricked into behaving substantially similar to a batch process. Such manipulation can result in rubber particles sizes of any desired size, due to polystyrene being occluded therewithin. Additionally, high reproducibility of results also follows.

EXAMPLES ACCORDING TO THE PRESENT INVENTION

The following examples should be considered illustrative of the invention and are not intended to limit the scope of the invention or the claims appended hereto.

A mixture of styrene, polystyrene, polybutadiene rubber (Diene 55 produced by the Firestone Tire & Rubber Company) and a peroxide catalyst (specifically, a t-butylperbenzoate) were mixed together in a CSTR, which was to function as a PIR, at a temperature of approximately 125° C. and under an agitation rate of approximately 120 RPM. When the percent solids in the PIR(R100) achieved a predetermined value which approaches the inversion point of the system, the output was then fed into a second CSTR (R101) which was in series with the PIR and which also had a predetermined percent solids value, the percent solids value (i.e., viscosity) of the second CSTR being determined based upon the viscosity of the solution in the PIR. The resultant product from the second CSTR was then fed into a series of plug-flow reactors which increased in temperature from 125° C. to 160° C. The product from the plug-flow reactors was then preheated, devolatized and pelletized. Experimental HIPS products were then produced and physical properties of the HIPS products were measured.

Table 1 shows a characterization of the polystyrene and the rubber produced by Firestone, both of which were utilized in the method according to the present invention.

TABLE 1

| Material | $\overline{M}n$ | $\overline{M}w$ |
|---|---|---|
| 7-8 wt % Diene 55 | 140,000 | 233,000 |
| Variable wt % polystyrene | 70-120,000 | 250-380,000 |

Table 2 shows the relationship between weight percent solids and viscosity in centipoise at 150° F. (65.5° C.). Thus, Table 2 gives a relative working comparison between percent solids by weight and viscosity. It should be noted that a family of relationships exist for percent solids versus viscosity dependent upon the $\overline{M}n$ of the rubber used and/or the $\overline{M}n$ of the polystyrene. Moreover, as discussed previously, other factors such as the amount of grafting, the concentration and types of additives or solvents used also affects the viscosity of the solution. Table 2 refers to a particular polybutadiene (Diene 55) and polystyrene used when the starting amount of Diene 55 is between 7-8 wt % solids.

TABLE 2

| Wt % Solids | Viscosity in Centipoise (65.5° C.) | Characterization |
|---|---|---|
| 10 | 4,400 | Pre Inversion |
| 12 | 5,200 | Pre Inversion |
| 14 | 3,400 | Pre Inversion |
| 15.8-16.0 | 2,200 | Inversion Minimum* |
| 18 | 4,400 | Post Inversion |
| 20 | 5,800 | Post Inversion |
| 24 | 8,100 | Post Inversion |
| 30 | 10,700 | Post Inversion |

*This represents a viscosity minimum corresponding to the lowest viscosity in the inversion zone (i.e., the lowest point of the curve in Zone II of Fig. 1).

Also, for comparison purposes, a process exactly the same as the process according to the present invention was followed, except that no PIR was used in series with the second CSTR. Accordingly, the 7-8% Diene 55 rubber solution was fed directly into the second CSTR (R101), as opposed to being premixed in the PIR. Moreover, the same grafting initiator was combined with the Diene 55 feed solution.

Table 3 shows the results of practicing the comparative process, while Tables 4 and 5 show results of practicing the present invention, with different weight percent solids being inputted into the second CSTR from the PIR in each of Tables 4 and 5. More particularly, each of Tables 3, 4 and 5 disclose the percent solids level in the relevant reaction vessels, $\overline{M}n$, $\overline{M}w$, total percent rubber, percent grafting, percent gel, swell index, falling dart impact strength and environmental stress crack resistance (ESCR) for two minute and thirty minute intervals. Moreover, each of the relevant parameters has been averaged and the standard deviation of the parameters is shown at the bottom of each column.

TABLE 3

7.7 Wt % Diene 55 Added Directly Into CSTR Having Average % Solids of 30.1 (No PIR Used).

| Ref. No. | % Solids R101 | R101 $\overline{M}n(K)$ | R101 $\overline{M}w(K)$ | % Rubber | % Grafting | % Gel | Swell Index | Part. Size | Falling Dart | ESCR 2 Min. | ESCR 30 Min. |
|---|---|---|---|---|---|---|---|---|---|---|---|
| 1 | 28.8 | 104 | 318 | 7.4 | 152 | 22.3 | 6.9 | 25 | 62 | 30.0 | 3.4 |
| 2 | 28.9 | 89 | 265 | 7.8 | 128 | 19.5 | 8.4 | 3 | 76 | 26.0 | 2.5 |
| 3 | 29.6 | 96 | 278 | 8.1 | 107 | 21.5 | 7.6 | 23 | 84 | 29.1 | 4.5 |
| 4 | 27.1 | 94 | 313 | 8.5 | 128 | 22.8 | 7.2 | 7 | 100 | 18.0 | 4.0 |
| 5 | 26.9 | 91 | 262 | 7.7 | 122 | 20.7 | 6.3 | 6 | 88 | 15.5 | 1.0 |
| 6 | 35.1 | 96 | 285 | 7.3 | 125 | 19.2 | 6.2 | 3 | 72 | 3.8 | 1.0 |
| 7 | 38.7 | 100 | 279 | 7.8 | 118 | 19.0 | 7.0 | 3 | 94 | 18.8 | 1.1 |
| 8 | 33.7 | 101 | 314 | 7.7 | 127 | 20.1 | 7.0 | 9 | 90 | 34.4 | 2.2 |
| 9 | 22.9 | 82 | 270 | 7.3 | 124 | 19.4 | 8.0 | 10 | 88 | 26.4 | 1.7 |
| Average | 30.1 | 95 | 287 | 7.7 | 126 | 20.5 | 7.1 | 10 | 84 | 22.4 | 2.4 |
| Std. Dev. | 5 | 7 | 22 | .4 | 12 | 1.4 | .7 | 8 | 12 | 9.4 | 1.3 |

TABLE 4

Two CSTR's Used In Series. First CSTR is PIR Having Total Percent Solids By Weight of Between 12.3-13.7 With Average Percent Rubber Being 7.2%

| Ref. No. | % Solids R100 | % Solids R101 | R101 $\overline{M}n(k)$ | R101 $\overline{M}w(k)$ | % Rubber | % Grafting | % Gel | Swell Index | Part. Size | Falling Dart | ESCR 2 Min. | ESCR 30 Min. |
|---|---|---|---|---|---|---|---|---|---|---|---|---|
| 10 | 13.6 | 30.6 | 108 | 376 | 6.9 | 165 | 22.0 | 7.8 | 28 | 112 | 40.1 | 5.3 |
| 11 | 13.7 | 30.3 | 104 | 370 | 7.2 | 149 | 22.8 | 7.4 | 54 | 100 | 53.4 | 12.5 |
| 12 | 12.3 | 30.0 | 106 | 371 | 7.3 | 163 | 22.4 | 7.3 | 16 | 104 | 57.8 | 13.2 |
| 13 | 13.0 | 33.2 | 116 | 425 | 7.6 | 154 | 24.8 | 6.5 | 50 | 100 | 45.5 | 9.1 |
| 14 | 13.1 | 29.9 | 106 | 389 | 7.4 | 167 | 22.4 | 7.4 | 30 | 100 | 59.6 | 9.2 |
| 15 | 12.3 | 32.9 | 110 | 360 | 7.1 | 168 | 21.7 | 7.6 | 32 | 108 | 47.1 | 4.6 |
| 16 | 13.5 | 32.7 | 96 | 337 | 7.2 | 163 | 22.7 | 7.8 | 58 | 112 | 44.0 | 9.3 |
| Average | 13.1 | 31.4 | 107 | 375 | 7.2 | 161 | 22.7 | 7.4 | 38 | 105 | 50 | 9.0 |

TABLE 4-continued

Two CSTR's Used In Series. First CSTR is PIR Having Total Percent Solids By Weight of Between 12.3–13.7 With Average Percent Rubber Being 7.2%

| Ref. No. | % Solids | | R101 | | % Rubber | % Grafting | % Gel | Swell Index | Part. Size | Falling Dart | ESCR | |
| | R100 | R101 | $\overline{Mn}$(k) | $\overline{Mw}$(k) | | | | | | | 2 Min. | 30 Min. |
| --- | --- | --- | --- | --- | --- | --- | --- | --- | --- | --- | --- | --- |
| Std. Dev. | 0.6 | 1.5 | 6 | 27 | 0.2 | 7 | 1 | 0.4 | 16 | 6 | 7 | 3.2 |

TABLE 5

Two CSTR's Used in Series, First CSTR is PIR Having Total Percent Solids By Weight of Between 14.1–16.4 With Average Percent Rubber Being 7.1%

| Ref. No. | % Solids | | R101 | | % Rubber | % Grafting | % Gel | Swell Index | Part. Size | Falling Dart | ESCR | |
| | R100 | R101 | $\overline{Mn}$(k) | $\overline{Mw}$(k) | | | | | | | 2 Min. | 30 Min. |
| --- | --- | --- | --- | --- | --- | --- | --- | --- | --- | --- | --- | --- |
| 17 | 14.1 | 29.6 | 99 | 387 | 7.1 | 168 | 21.6 | 7.5 | 18 | 120 | 40.6 | 10.1 |
| 18 | 14.6 | 29.7 | 104 | 345 | 6.9 | 169 | 21.9 | 7.8 | 38 | 120 | 42.3 | 11.0 |
| 19 | 15.7 | 31.6 | 113 | 352 | 6.9 | 155 | 22.0 | 7.4 | 29 | 116 | 41.7 | 13.2 |
| 20 | 14.2 | 31.0 | 110 | 385 | 7.1 | 166 | 22.7 | 7.7 | 21 | 124 | 50.4 | 9.9 |
| 21 | 16.4 | 32.0 | 111 | 364 | 7.4 | 150 | 22.0 | 7.1 | 27 | 108 | 57.2 | 5.5 |
| 22 | 14.1 | 33.2 | 114 | 397 | 7.4 | 154 | 21.8 | 7.7 | 21 | 108 | 77.3 | 11.8 |
| Average | 14.9 | 31.2 | 109 | 372 | 7.1 | 160 | 22 | 7.5 | 26 | 116 | 52 | 10.3 |
| Std. Dev. | 1.0 | 1.4 | 5.8 | 21 | 0.2 | 8 | 0.4 | 0.3 | 7 | 7 | 14 | 2.6 |

Each of the parameters included in Tables 3, 4 and 5, and how such parameters were determined shall now be discussed.

DETERMINATION OF % GRAFTING AND % RUBBER

Free polystyrene (ungrafted, uncrosslinked) is separated from the "insolubles" (i.e., rubber, grafted and crosslinked polystyrene) by methylethylketone (MEK) extraction. The resulting residue is dissolved in dichloromethane and the % rubber is determined.

The % Graft: Rubber Ratio is defined as the weight of grafted polystyrene divided by the weight of rubber, multiplied by 100.

The percentage of rubber in HIPS is determined by reacting the double bonds in the rubber with excess iodine monchloride (ICl). The amount of rubber which undergoes the reaction is determined by a back titration of the excess ICl with standardized thiosulfate and comparison with a blank titration of the ICl.

Calculations

% Rubber - See % Rubber Determination   (1)

$$\% \text{ Insolubles} = \frac{W_I \times 100\%}{W_S} \quad (2)$$

% Grafting (% Graft/Rubber × 100) - currently reported.   (3)

$$\% \text{ Grafting} = \frac{W \text{ Grafted } PS}{W \text{ Rubber}} = \frac{(W_I - W_R^*)}{W_R}$$

$$= \frac{(100 - \% \text{ Rubber}) \times 100}{\% \text{ Rubber}}$$

DETERMINATION OF % GEL AND SWELL INDEX

The swelling index of high impact polystyrene is determined as the ratio of weight of the swollen gel (extracted with toluene) to the weight of the dried gel. The gel content is determined as dried weight of the gel (after toluene extraction of the polystyrene sample) divided by the total weight of the sample. It is usually reported as a percentage.

Calculations $$\text{swelling index} = \frac{g. \text{ swollen gel}}{g. \text{ dry gel}}$$

$$\% \text{ gel content} = \frac{g. \text{ dry gel}}{g. \text{ initial sample}} \times 100$$

Particle Size

The particle size referred to in each of Tables 3, 4 and 5 relates to the number of particles which are greater than 5 μm in a viewing field which is 77×100 μm (i.e., 7,700 μm$^2$). While the percent of particles greater than 5 μm has not been calculated, the manner for calculating such percent of particles larger than 5 μm is given below:

$$\frac{(\text{No. of particles greater than 5 μm}) \times (2.5)^2 \pi}{7700 \text{ μm}^2} \times$$

$$100 = \% \text{ of particles larger than 5 μm}$$

Experimental Determination of Impact Resistance By Falling Dart Method

The falling dart method utilized in the experimentation paralleled ASTM Standard D 1709 which relates to the determination of the energy which causes a polyethylene film to fail under specified conditions due to the impact of a free-falling dart. No further discussion of this ASTM testing method is included.

EXPERIMENTAL DETERMINATION OF ESCR

Description

Tensile bars are exposed to margarine (no-salt) for varying times in an oven at 65° C. (149±2° F.). ESCR is determined by measuring percent elongation.

Sample Preparation

Samples are injection molded according to ASTM procedures. Ten tensile bars are molded preferably without silicone mold release. Oil, grease or other chemicals should not come in contact with the bars to be tested. Surfaces to be exposed to margarine should not be touched. The sample bars should be allowed to sit for an hour before testing.

Testing

Seven tensile bars are carefully positioned in a sample holder. The bars are then wiped with a thin coat of margarine ±1" from their midpoint (i.e., spread over approximately 2" of the sample) starting with the sample that will be pulled out last. The samples are exposed for 2, 7, 12, 17, 23, 30 and 45 minutes in an oven at 65° C. (149° F.). Since the oven is opened and closed several times, it is necessary to pull the sample out quickly.

Margarine is wiped off the samples as soon as they are removed from the oven. The samples are allowed to sit for one to two hours before determining percent elongation.

The sample holder is made of wood or metal. Maximum strain is calculated according to the following formula (ASTM D-790):

$$\text{Strain} = \frac{6\,Dd}{L^2}$$

D = max. deflection of the center beam
L = support span
d = depth or thickness of sample Calculations:

Percent elongation data is plotted using a 2-cycle log/log paper (% E as ordinate, time (min) as abscissa). The best straight line is drawn and the % elongation at 2 minutes and 30 minutes is determined therefrom. A better method is to calculate the best least squares line and calculate the % elongation at 2 and 30 minutes.

Comparison of Present Invention to Conventional Techniques

The following table shows a comparison between the comparative data in Table 3 (referred to as "Base") and the data in Tables 4 and 5 which correspond to the method of the present invention.

ing dart and ESCR). Additionally, it should be noted that % gels and Swell Index were fairly constant.

While many experiments have been run in an attempt to determine precisely the mechanism which results in enhanced values of ESCR and falling dart impact strength, a quantitative model has not been achieved. Moreover, it is clear that the viscosity matching between the PIR and the first CSTR can result in enhanced HIPS properties. However, it is clear that use of the PIR is critical to obtain desirable HIPS properties and to input better control to the continuous flow process (i.e., cause the continuous flow process to behave more like a batch process).

Figure 3A:
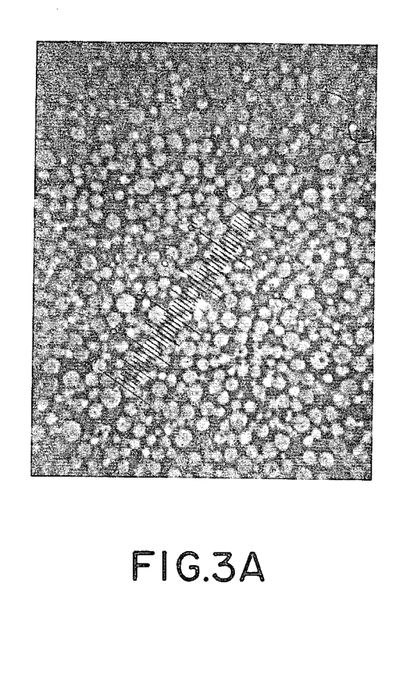
FIGS. 3A and 3B are photomicrographs of HIPS products produced according to a known continuous production process taken at a magnification of 1000 X.
Figure 3B:
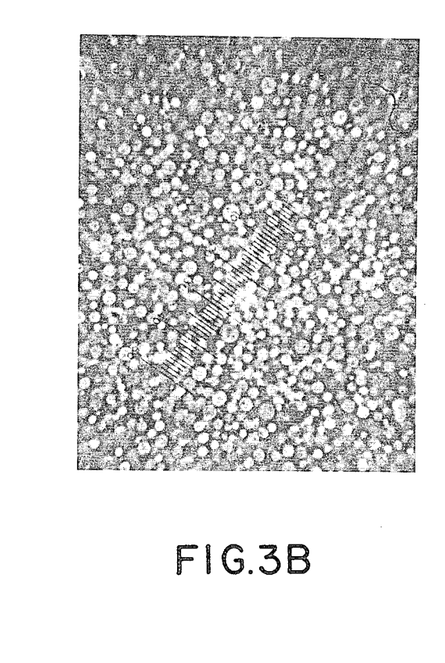

Also, for comparison purposes, representative photomicrographs of the samples disclosed in Tables 3, 4 and 5, respectively, have been included. Particularly, FIGS. 3A and 3B relate particularly to sample No. 2 but are representative of all of the samples 1-9. FIG. 3A is a representative cross section of the material taken from R101, while FIG. 3B is a representative example of a HIPS pellet.

Figure 4A:
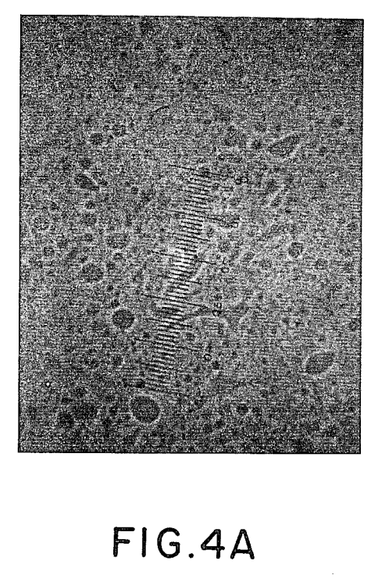
FIGS. 4-5 are photomicrographs of HIPS products which are produced by the method according to the present invention taken at a magnification of 1000 X.
Figure 4B:
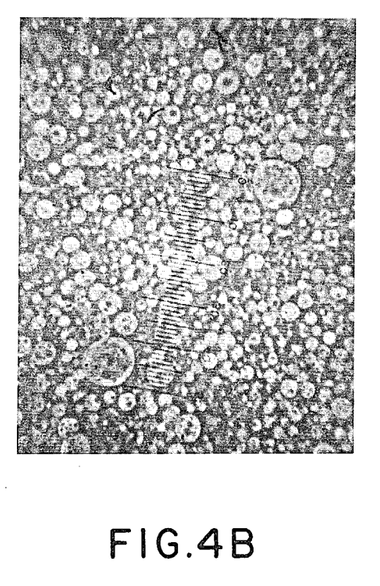
Figure 4C:
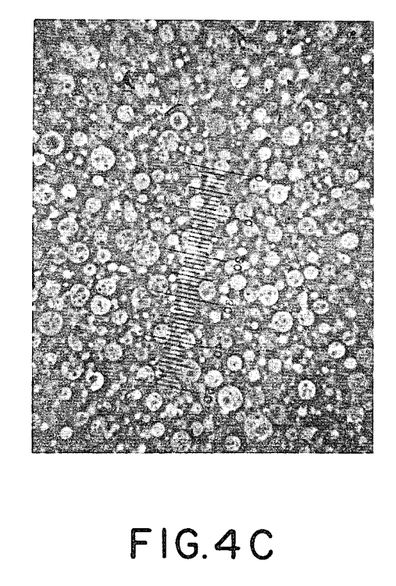

FIGS. 4A, 4B and 4C relate particularly to sample No. 10, but are representative of each of Sample Nos. 10-16. FIG. 4A shows material taken from the PIR (R100); FIG. 4B shows material taken from R101 and FIG. 4C is a representative cross section of a HIPS pellet produced by the process according to the invention.

Figure 5A:
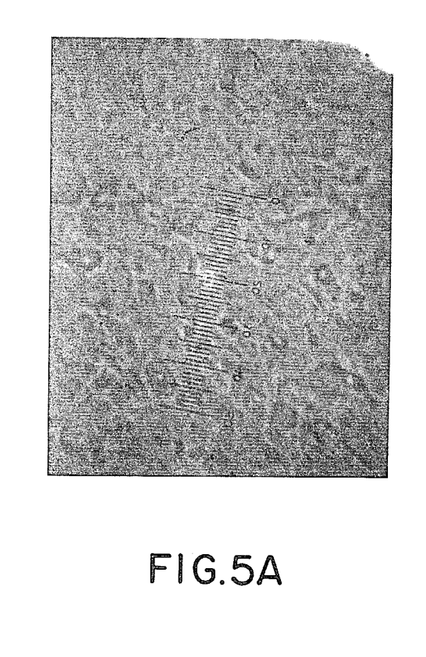
Figure 5B:
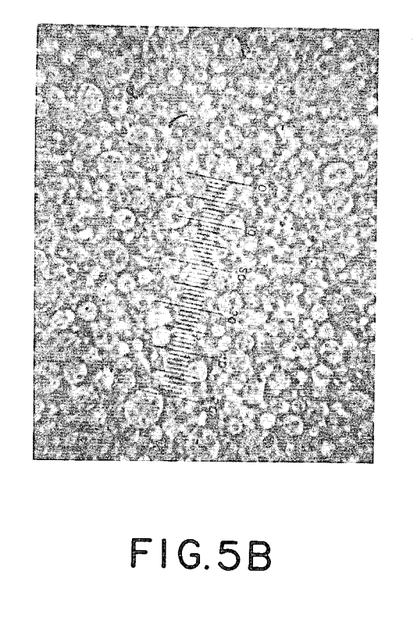
Figure 5C:
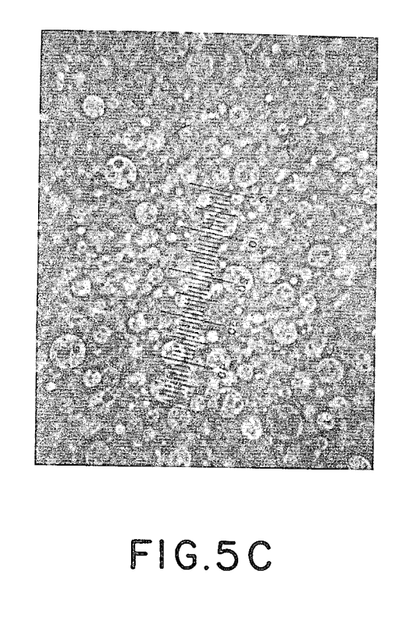

FIGS. 5A, 5B and 5C are representative examples of Sample Nos. 17-22. Particularly, FIGS. 5A-5C relate directly to Sample No. 18. FIG. 5A is a representative sampling of the PIR (R100; FIG. 5B is a representative sampling of R101; and FIG. 5C is a representative cross section of a HIPS pellet produced according to the method of the invention.

As evidenced from each of these FIGS., the solution

TABLE 8

Comparison Between Products Produced According to the Invention and the Base Case

| Parameter | Base (1 CSTR) | 12.3–13.7 % Solids | % Change From Base | 14.1–16.4 % Solids | % Change From Base |
|---|---|---|---|---|---|
| % Solids R 100 | — | 13.1 | — | 14.9 | — |
| % Solids R 101 | 30.1 | 31.4 | +4.3 | 31.2 | +3.6 |
| Mn R 101 | 95.0 | 107.0 | +12.6 | 109.0 | +14.7 |
| Mw R 101 | 287.0 | 375.0 | +30.7 | 372.0 | +29.6 |
| % Rubber | 7.7 | 7.2 | −6.5 | 7.1 | −7.8 |
| % Graft | 126.0 | 161.0 | +27.8 | 160.0 | +27.0 |
| % Gel | 20.5 | 22.7 | +10.7 | 22.0 | +7.3 |
| Swell Index | 7.1 | 7.4 | +4.2 | 7.5 | +5.6 |
| Particle Size | 10.0 | 38.0 | +280.0 | 26.0 | +160.0 |
| Falling Dart | 84.0 | 105.0 | +25.0 | 116.0 | +38.0 |
| ESCR 2 min. | 22.4 | 50.0 | +123.0 | 52.0 | +132.0 |
| ESCR 30 min. | 2.4 | 9.0 | +275.0 | 10.3 | +329.0 |

Observations Based on Experimental Results

In HIPS products the falling dart impact strength and the environmental stress crack resistance are of primary importance. Table 8 shows the relative increase in each of these parameters as compared to the Base case which did not utilize a PIR. The average percent solids in R101 into which the rubber is directly fed (Reference Nos. 1-9) or first fed through a PIR (Reference Nos. 10-22) was substantially constant. Thus, the viscosity in R101 in each of the experiments was substantially constant. Moreover, less actual rubber was utilized in sample Nos. 10-22, than in sample Nos. 1-9, while better falling dart and ESCR values were achieved. This is contrary to what would be expected (i.e. less rubber would be expected to result in decreased values of falling dart and ESCR).

present in R101 is substantially identical to the resultant cross section of HIPS pellets produced after the R101 solution has been subjected to a series of plug-flow reactors, heating, devolitization and pelletizing. Thus, it is clear that to control the grain size of the rubber, the solution present in R101 is critical (i.e. whatever solution is produced in R101 corresponds substantially identically to the grain structure in resultant HIPS pellets).

Moreover, the photomicrographs shown in FIGS. 4A–C and 5A–C clearly show the difference in the amount of polystyrene occluded within polybutadiene pellets, as compared to FIGS. 3A and 3B which do not utilize a PIR. It is clear that the average grain size of the rubber molecules produced without utilizing a PIR is much smaller than the average grain size of the molecules produced utilizing a PIR.

Thus, the advantages which result from practicing the process according to the present invention are clearly shown by the results in Tables 3-5 and 8 and in FIGS. 3-5.

While several embodiments of the invention have been illustrated, it is to be understood that the invention is not confined to the precise disclosure, and it will be apparent to those skilled in the art that various changes and modifications may be made without departing from the spirit of the invention or from the scope of the appended claims.

What is claimed is:

1. A process for the production of high impact polystyrene, comprising:
    prepolymerizing a first mixture of at least one vinylaromatic monomer and a rubber in a first continuous stir tank reactor to a point below an inversion point of the first mixture;
    determining a viscosity of the first mixture;
    feeding said first mixture into a second continuous stir tank reactor having therein a second mixture of at least one vinylaromatic monomer and a rubber which has been polymerized to a point above an inversion point of the second mixture, such that a viscosity of the second mixture is within a factor of 2-3 of the viscosity of the first mixture; and
    feeding the mixture from the second continuous stir tank reactor into at least one plug-flow reactor, and thereafter removing non-reacted monomer to produce a high impact polystyrene product.

2. The process according to claim 1, wherein said first mixture and said second mixture have substantially the same chemical composition, but have been subjected to different amounts of polymerization.

3. The process according to claim 1, wherein said point above the inversion point of the mixture is within a post-inversion zone.

4. The process according to claim 1, wherein said vinyl aromatic monomer comprises a material selected from the group consisting of styrene, alphamethylstyrene and ring-substituted styrenes.

5. The process according to claim 2, wherein said vinyl aromatic monomer comprises a material selected from the group consisting of styrene, alphamethylstyrene and ring-substituted styrenes.

6. The process according to claim 1, wherein said rubber comprises polybutadiene.

7. The process according to claim 2, wherein said rubber comprises polybutadiene.

8. The process according to claim 1, wherein a peroxide catalyst is added to said first mixture.

9. The process according to claim 8, wherein said peroxide catalyst comprises t-butylperbenzoate.

10. A process for the production of high impact polystyrene, comprising:
    prepolymerizing a first mixture of at least one vinylaromatic monomer, at least one rubber and a peroxide catalyst, said vinylaromatic monomer being selected from the group consisting of styrene, alphamethylstyrene and ring-substituted styrenes, said prepolymerizing occurring in a first continuous stir tank reactor to a point below an inversion point of the first mixture;
    feeding said first mixture into a second continuous stir tank reactor having therein a second mixture of substantially the same chemical composition as said first mixture, said second mixture having been polymerized to a post-inversion state, such that a viscosity of the second mixture is within a factor of 2-3 the viscosity of the first mixture; and
    feeding the mixture from the second continuous stir tank reactor into at least one plug flow reactor, and thereafter removing non-reacted monomer to produce a high impact polystyrene product.

11. A process according to claim 1, wherein said removal of the non-reacted monomer occurs by utilizing a preheater and a devolatizer after said at least one plug-flow reactor.

12. A process according to claim 10, wherein said removal of the non-reacted monomer occurs by utilizing a preheater and a devolatizer after said at least one plug-flow reactor.

* * * * *